United States Patent
Bunimov et al.

(10) Patent No.: US 7,949,128 B2
(45) Date of Patent: May 24, 2011

(54) METHOD AND DEVICE FOR THE ENCRYPTION AND DECRYPTION OF DATA

(75) Inventors: Viktor Bunimov, Braunschweig (DE); Dietmar Waetjen, Braunschweig (DE); Manfred Schimmler, Kiel (DE)

(73) Assignee: Wired Connections LLC, Wilmington, DE (US)

( * ) Notice: Subject to any disclaimer, the term of this patent is extended or adjusted under 35 U.S.C. 154(b) by 1139 days.

(21) Appl. No.: 11/605,486

(22) Filed: Nov. 29, 2006

(65) Prior Publication Data
US 2007/0195948 A1 Aug. 23, 2007

Related U.S. Application Data

(63) Continuation of application No. 10/259,806, filed on Sep. 30, 2002, now abandoned.

(51) Int. Cl.
H04K 1/00 (2006.01)
H04L 9/00 (2006.01)
H04L 9/28 (2006.01)

(52) U.S. Cl. .......................................... 380/28
(58) Field of Classification Search ...................... 380/28
See application file for complete search history.

(56) References Cited

U.S. PATENT DOCUMENTS

| | | | |
|---|---|---|---|
| 5,295,188 A | 3/1994 | Wilson et al. | 380/30 |
| 5,440,640 A | 8/1995 | Anshel et al. | 380/46 |
| 6,125,183 A | 9/2000 | Jiawook et al. | 380/28 |
| 6,269,164 B1 * | 7/2001 | Pires | 380/42 |
| 6,445,794 B1 | 9/2002 | Shefi | 380/46 |
| 6,526,145 B2 | 2/2003 | Marzahn | 380/42 |
| 6,873,706 B1 | 3/2005 | Miyazaki et al. | 380/30 |
| 7,003,107 B2 | 2/2006 | Ananth | 380/37 |
| 7,237,116 B1 * | 6/2007 | Dwork et al. | 713/180 |

FOREIGN PATENT DOCUMENTS

| | | |
|---|---|---|
| EP | 0 899 956 | 3/1999 |
| JP | 11/161164 | 6/1999 |

OTHER PUBLICATIONS

Schneier, Bruce, Applied Cryptography, 1996, John Wiley & Sons, Inc., Second Edition, pp. 216 and 466-468.*
Schneier, B., "Applied Cryptography," John Wiley & Sons, Inc., $2^{nd}$ Edition, 1996, pp. 216, 466-468.
European Patent Examination Report dated Jan. 23, 2004, 8 pages, Report for Application No. 02020917.7.
European Search Report for Application No. 02020917.7-2413, Scarch Report dated Dec. 23, 2002, 3 pages.
German Patent Office Examination Report dated Jul. 17, 2002, 3 pages.

* cited by examiner

Primary Examiner — Kambiz Zand
Assistant Examiner — Stephen Sanders (57) ABSTRACT

Method for the encryption of data as well as a corresponding decryption method are set forth. In order to guarantee a secure transmission of data with relatively little effort, an encryption method is provided in which a key vector with a second length is generated from a secret key information vector with a short length and a public matrix with a size corresponding to the first length times a second length, which is greater than the first size, and in which an encryption vector is formed by means of a first encryption method from a data vector with a third length, which is less than or equal to the second length, and the key vector.

25 Claims, 6 Drawing Sheets

Fig. 8

METHOD AND DEVICE FOR THE ENCRYPTION AND DECRYPTION OF DATA

CROSS REFERENCE TO RELATED APPLICATIONS

This application claims the priority of U.S. application Ser. No. 10/259,806, filed Sep. 30, 2002, which claims the priority of German Application No. 101 48 415.1, filed Sep. 29, 2001, and each of which is incorporated herein by reference.

FIELD OF THE INVENTION

The invention relates to a method and a device for the encryption as well as decryption of data and a method of transmission making use of such a method.

BACKGROUND OF THE INVENTION

As a rule, when confidential data are transmitted via insecure channels, the data are encrypted on the transmitter side, the encrypted data transmitted, and the encrypted data decrypted again by the receiver. To do this, various encryption or cryptographic methods are known:

The role of traditional cryptographic methods employing, for example, transposition encryption and simpler or more complex substitutions has now become practically insignificant because methods of attack are generally known for this; therefore, there can be no adequate guarantee of security against decryption by third parties.

In the so-called secret key methods transmitter and receiver employ a secret code that should not be known to attackers. Block encryption, stream encryption and encryption via hash functions are known in this respect. Block encryption methods contain symmetric algorithms that process the original data or the plain text block by block, whereby a fixed block size is specified.

Stream encryption methods are symmetric methods that process the plain text bit by bit or byte by byte, e.g. One-Time-Pad, RC4, SEAL, WAKE, FCSRs. In the One-Time-Pad method the plain text is reproduced by bit vectors of length l, whereby each bit vector is encrypted with a secret key vector of length $p \geqq 1$. In this case every data vector of the plain text is interlinked with the key vector bit by bit by way of XOR so that a bit string of length r is output. Hence, the encrypted text contains a sequence of bit vectors with length r and is sent to the receiver. The receiver can then link the encryption vectors with the key vector again bit by bit by way of XOR and from this obtain the data vectors of the plain text again. In doing so, the mathematical property of the XOR function is exploited such that the duplicated XOR linking of a first Boolean variable with a second Boolean variable leads to the first Boolean variable again, which means that the XOR link is an inversion in itself.

This method of encryption—like other stream encryption methods—is secure when a sufficiently large key vector is used. In this respect, bit vectors of length, for example, r=65 536 bits are normally used. High data rates exceeding 1 MB/s or even 1 GB/s are possible with such secret key methods.

However, one particular problem is the transmission of the secret key that the receiver requires to decrypt the information. The transmission and secure storage of the key is, in cryptographic terms, a weak point with regard to attack by third parties, which means that secret key methods are used only to a limited extent.

Asymmetric methods, also called public key methods, are also known. In these methods there is a public key that can be used by anyone to encrypt a plain text and send the encrypted text to the receiver. The receiver has a private key with which he can decrypt the encrypted information. The private key is known only to the receiver; and when the code is sufficiently long, the private key also cannot be derived from the public key with a feasible computational effort. Examples of asymmetric methods regarded as secure are, in particular, RSA, Rabin, ElGamal, McEliece, cryptosystems based on elliptical curves and probabilistic public key encryption. The latter employs random values for the encryption.

The disadvantage of the public key method, especially the probabilistic public key method, is the high computational effort required on both the transmission and the reception side. Data rates of 1 MB/S, e.g. 1024 bits—regarded these days as a secure key length—for RSA, are only possible at present with special hardware; data rates of 1 GB/s cannot be achieved with the hardware currently available.

OBJECTS AND SUMMARY OF THE INVENTION

It is an object of the invention to supply improvements as compared to the state of the art and, in particular, to create methods for encrypting a plain text, decrypting the encrypted text, suitable devices for doing this and a method of transmission making use of the encryption and decryption method according to the invention in which a high level of security against unauthorized access by third parties is guaranteed but the computational effort is nonetheless not excessive so that even high data rates are possible and, advantageously, processing in real time is made possible. In doing so, it should be regarded as an advantage when the security against unauthorized access is at least as high as with the known methods.

This object is achieved by an inventive encryption method for the encryption of data in which a key vector with a long second length is generated from a secret key information vector with a short first length and a public matrix; and an encryption vector is formed from a data vector with a third length, which is shorter than or equal to the second length, and the key vector by means of a first encryption method.

This object is likewise achieved by an inventive decryption method for decryption of encrypted data, which have been formed by an encryption method according to the invention, in which a key vector with a long second length is formed from a key information vector with a short first length and a public matrix; and a data vector with the long second length is formed from an encryption vector with the long second length and the key vector by means of a first decryption method.

This object is achieved by an inventive method for the encrypted transmission of data from a transmitter to a receiver in which the transmitter generates encryption vectors from data vectors, a key information vector and a public matrix by way of an inventive encryption method, the encryption vectors and the key information vector are sent to a receiver, and the receiver decrypts the encryption vectors from the public matrix and the key information vector by means of an inventive method for the decryption of encryption data.

This object is achieved as well by the inventive devices for performing the inventive encryption and decryption methods according to any of the embodiments of the invention, such as an inventive device for encryption of data by means of an inventive encryption method, the encryption device including a key calculation device for calculating a key vector with a long second length from a key information vector with a short first length and a matrix, and a first encryption device for recording the key vector and a data vector with a third length, which is less than or equal to the long length, and supplying an encryption vector with the long length.

There is likewise an inventive device for decryption of encrypted data by means of one of the inventive decryption methods, the device including a key calculation device for calculating the key vector with a long second length from a key information vector with a short first length and a matrix; and a decryption device for recording an encryption vector with the long length and the key vector and for supplying a data vector with the long second length.

The object is achieved by a computer program for executing the inventive methods and controlling the inventive device.

A computer-readable medium is provided that contains instructions for controlling a computer system to perform any of the inventive methods and to control any of the devices.

A concept behind the invention is to encrypt a plain text making use of a secret key and not to transmit the key itself but instead to send to the receiver only information of minimum length from which the key can be generated. For this purpose, the public key available to both transmitter and receiver is a table or matrix with p rows and r columns (or vice versa) whose elements are randomly determined single bits.

For encryption, in a first step the transmitter generates the key with the greater length from this table using the key information and subsequently applies a first encryption method with the help of the key obtained in this way. This encryption method can be, in particular, stream encryption, e.g. the One-Time-Pad method, that enables a high encryption speed and a high level of security against decryption without knowledge of the key. According to the invention, in order to do this the plain text is subdivided into data vectors with a third length that is less than or equal to the long length and can be encrypted directly using the key with the greater length. As a rule, the third length advantageously corresponds to the long length; however, for example, residual bits can also be placed in smaller data vectors or the data vectors filled up correspondingly with zeros. The subdivision of the data into data vectors and the linking of each one of them with the key vector can, for example, also be achieved by linking the bit string of the data continuously with a bit string from consecutive key vectors without individual data vectors being explicitly formed and temporarily stored.

The relatively small amount of key information can in this case be encrypted by means of a secure second encryption method requiring somewhat more intensive computational effort, e.g. a public key method such as RSA, and transmitted to the receiver. As the key information has a shorter length than the key used for the first encryption method, the computational effort for encrypting and decrypting the key information is not excessive. The receiver again obtains the key from the key information and the public table and can thus retrieve the plain text by using a second decryption method.

In the randomly generated table or matrix, pair-by-pair equality and the occurrence of zero vectors can be excluded as a restrictive criterion in order to increase the level of security. Furthermore, when generating the key information vector a restrictive criterion can be to set the number of zeros and ones to be approximately equal, e.g. by stipulating upper and lower limits for zeros or ones about the middle value (p/2).

According to the invention, compared to a conventional secret key method there is a considerable reduction in computational effort because merely the relatively small amount of key information needs to be transmitted in order to transmit the secret key. The information can therefore be encrypted with a high level of security by using a secure method involving intensive computations. In doing so, for example, key information with 256 bits can be used to identify a key with 65 536 bits.

The generation of the key with the long length r from the key information with short length p and the p×r matrix can be achieved, for example, by the transmitter selecting t integers at random from the integers 0 to p−1, whereby, for example, t=p/2. The rows in the table corresponding to these integers are linked bit by bit by means of XOR to form a bit string r, from which the key vector can be obtained. As an alternative to this method, somewhat modified methods are basically possible in accordance with the invention, e.g. using the inverse function on the key vector obtained in this way. The bit vector that identifies the t integers is encrypted as a key information vector by the second encryption method and sent to the receiver.

The calculations for obtaining the key vector from key information vector and table or matrix can be carried out—at least partly—by means of hardware in particular by calculating the individual digits of the key vector by way of suitable hardware circuitry from the digits of the matrix and the key information vector. The XOR linking of data vector and key vector at the transmitter—or encryption vector and key vector at the receiver—can also be carried out by suitable hardware to create a method that can be carried out fast but still guarantee a high level of security. Consequently, a very secure but slow second encryption method for the key information can be combined with the fast, first encryption method for the plain text.

According to the invention the key information can advantageously be encrypted with and transmitted as part of the plain text in an. Consequently, in the first data transmission from transmitter to receiver merely the key information is encrypted, transmitted and subsequently decrypted again by means of the second encryption method. In the subsequent encryption method the key information transmitted previously in plain text can be used by the receiver to decrypt the encrypted data in order to reduce the effort required to encrypt and decrypt the key information. In doing so, new key information can be provided, in particular successively, by the transmitter every time in plain text from which the receiver can obtain new key information in each case for the decryption of the following encrypted data, whereby in each case the same public table can be used without having to accept drawbacks in terms of security. Therefore, in this preferred further development maximum data rates are possible without having to compromise security.

Relative terms such as up, down, left, right, row, column, height, width, and the like are for convenience only and are not intended to be limiting.

BRIEF DESCRIPTION OF THE DRAWINGS

The invention is explained in more detail below by way of a number of embodiments with the help of the accompanying drawings.

DETAILED DESCRIPTION OF THE INVENTION

Figure 1:
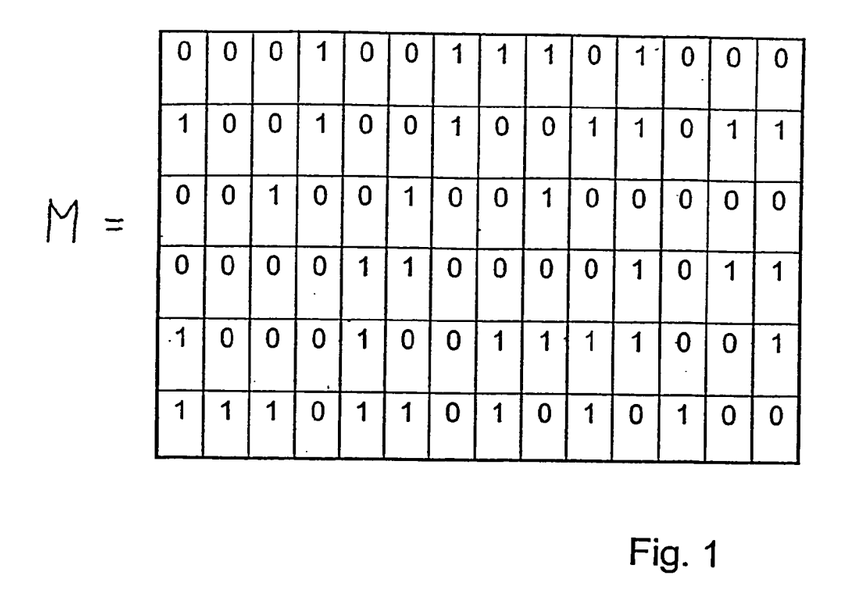
FIG. 1 shows an example of a random matrix for the encryption and decryption method according to the invention.

FIG. 1 shows a random matrix M whose elements $M_{ij}$, where i=1 . . . p=6 and j=1 . . . , r=14, are each one bit generated by a random number generator. An exclusion criterion for selecting the matrix can specify that the column vectors (small matrix vectors) are never equal and, for example, no zero vectors occur.

Figure 7:
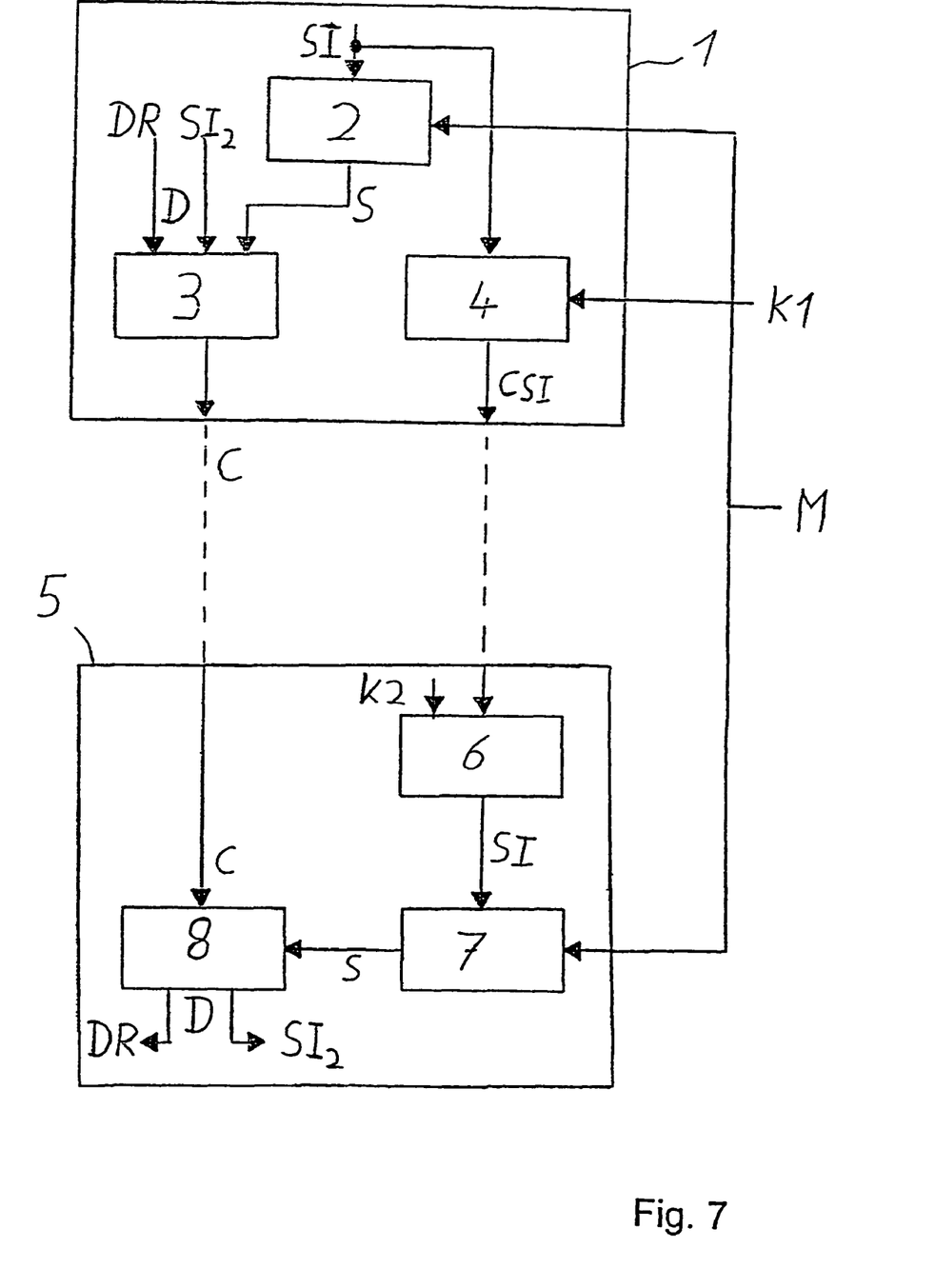
FIG. 7 shows a block diagram of a transmitting device and receiving device according to an embodiment of the invention.

According to FIG. 7 a receiver 1 has a key calculation device 2, a first encryption device 3 and a second encryption device 4. The transmitter 1 selects a key information vector SI as a p-digit bit vector. This can again be carried out using a random number generator; the creation of this key information vector corresponds to the selection of t different rows of the p-row matrix M according to FIG. 2, whereby when selecting a row—according to FIG. 2 the first, third and sixth rows—the respective digit of the bit vector SI is set to 1 and the remaining digits to 0.

Figure 2:
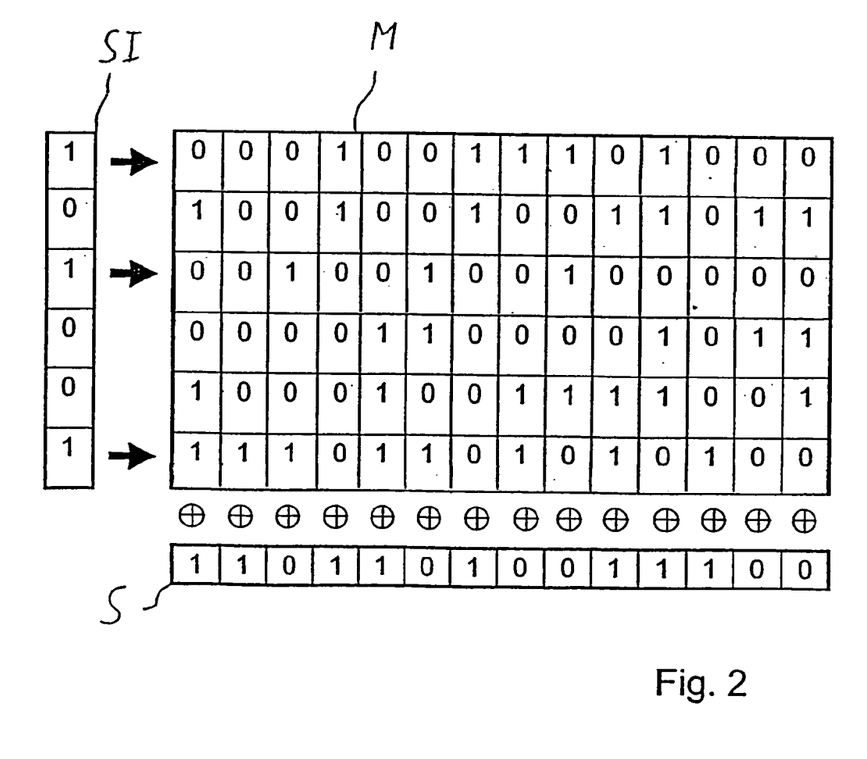
FIG. 2 shows the step for generating a key from the matrix and key information.

The key calculation device 2 calculates a 14-digit secret key vector S as a 14-digit binary number, which is explained in more detail in FIG. 2, from the secret six-digit key information vector SI and the public 6×14 matrix M. The digits of the 6-digit key information vector SI signify the rows of the matrix M relevant for determining the key vector S. The 14-digit row vectors determined in this way are interlinked bit by bit by the XOR function such that the interlinking of an even number of ones produces a zero at the corresponding digit of the 14-digit key vector S, and the interlinking of an odd number of ones produces a one. Hence, this calculation corresponds to a matrix multiplication of the 6×14 matrix with the 6-digit vector SI to produce the 14-digit vector S, whereby for the multiplication of the elements the AND link is used and for the addition of the factors formed in this way the XOR function (which corresponds to a half adder).

According to FIG. 7 the key vector S obtained in this way is input together with a data vector D (consisting of components DR and $SI_2$) of length r=14 into a first encryption device 3 in which they are combined through a bit-by-bit linking by means of the XOR function to form an r=14-digit encryption vector C. This linking therefore corresponds to the One-Time-Pad method.

Figure 4:
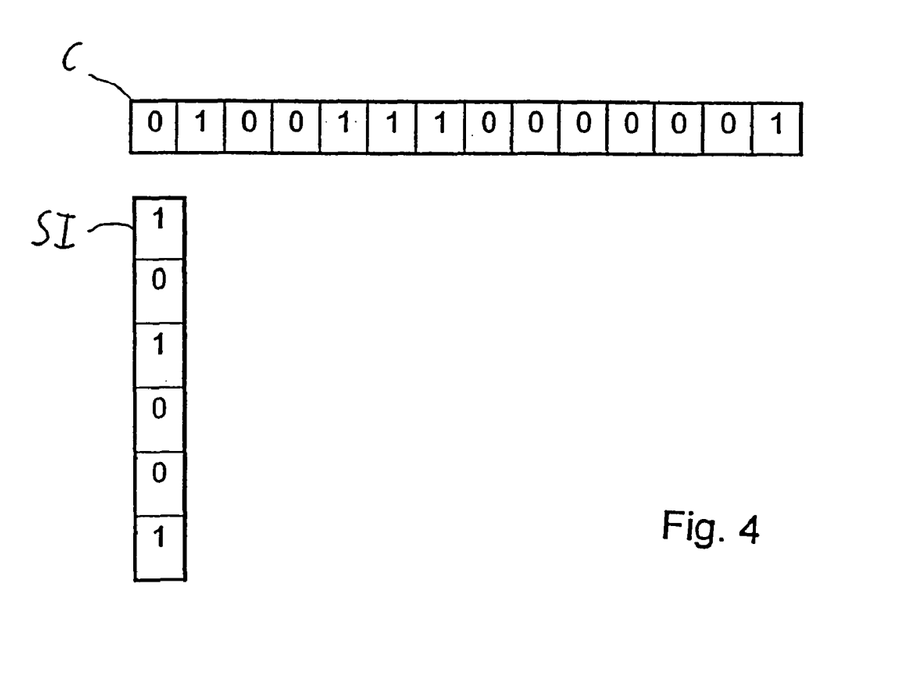
FIG. 4 shows the data sent to the receiver.

According to FIG. 7 the key information vector SI is further encrypted in a second encryption device 4 using a public key K1, which, for example, can be taken from an RSA method or another public key method. The key information vector CSI encrypted in this way is subsequently—together with the encryption vector C—relayed by the transmitter 1 via a transmission channel to the receiver 5. The data thus sent to the receiver 5 are reproduced in FIG. 4, whereby the key information vector is shown without encryption here.

Figure 3:
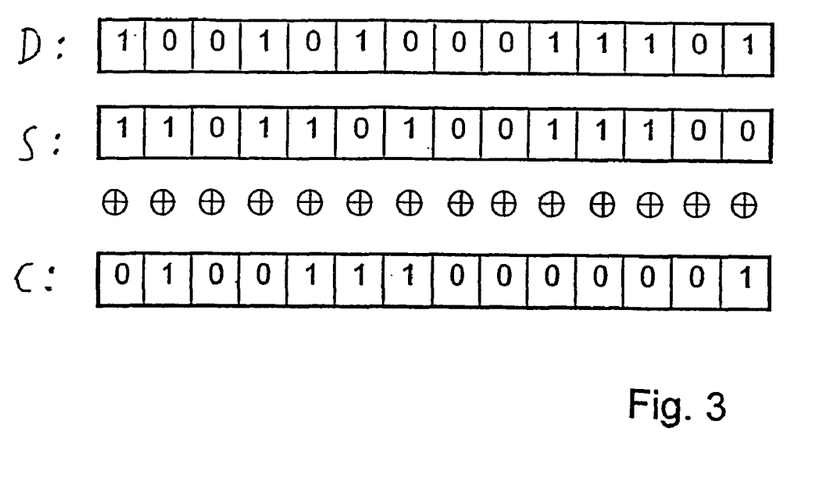
FIG. 3 shows the step for encrypting the plain text by means of the key.
Figure 5:
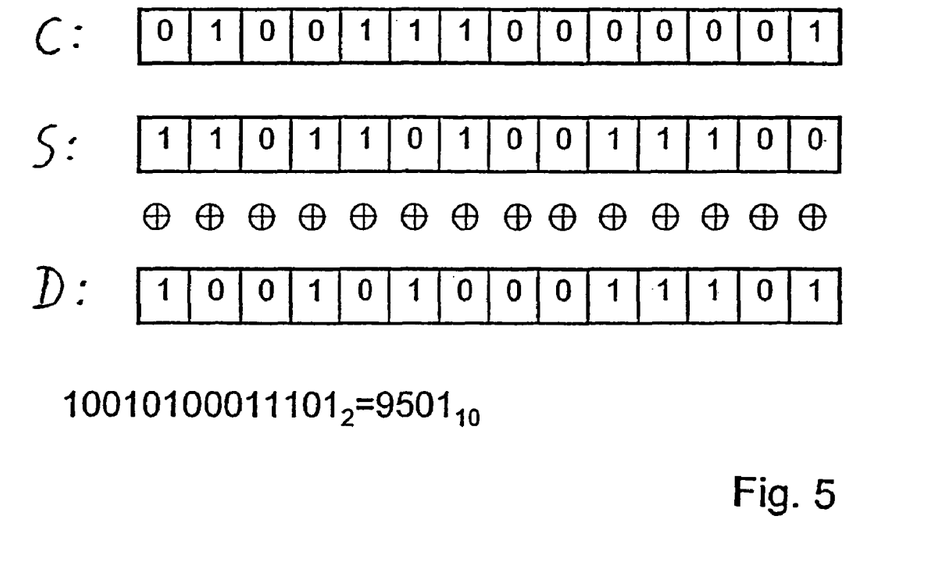
FIG. 5 shows the step for decrypting the encrypted data at the receiver.

The receiver first uses his private key K2 to decrypt the encrypted key information vector CSI in a second decryption device 6 and forms the key vector S from the key information vector and the public matrix M in the key calculation device 7—which can correspond to the key calculation device 2. The data vector D (with its components DR and $SI_2$) is again obtained from the key vector S and the encryption vector C in the first decryption device 8 according to the method shown in FIG. 5. Here, the r-digit data vector D is obtained by the bit-by-bit linking of the encryption vector C and the key vector S according to the method shown in FIG. 3 and output, possibly by converting it to a decimal number—in this case the decimal number 9501.

Figure 6:
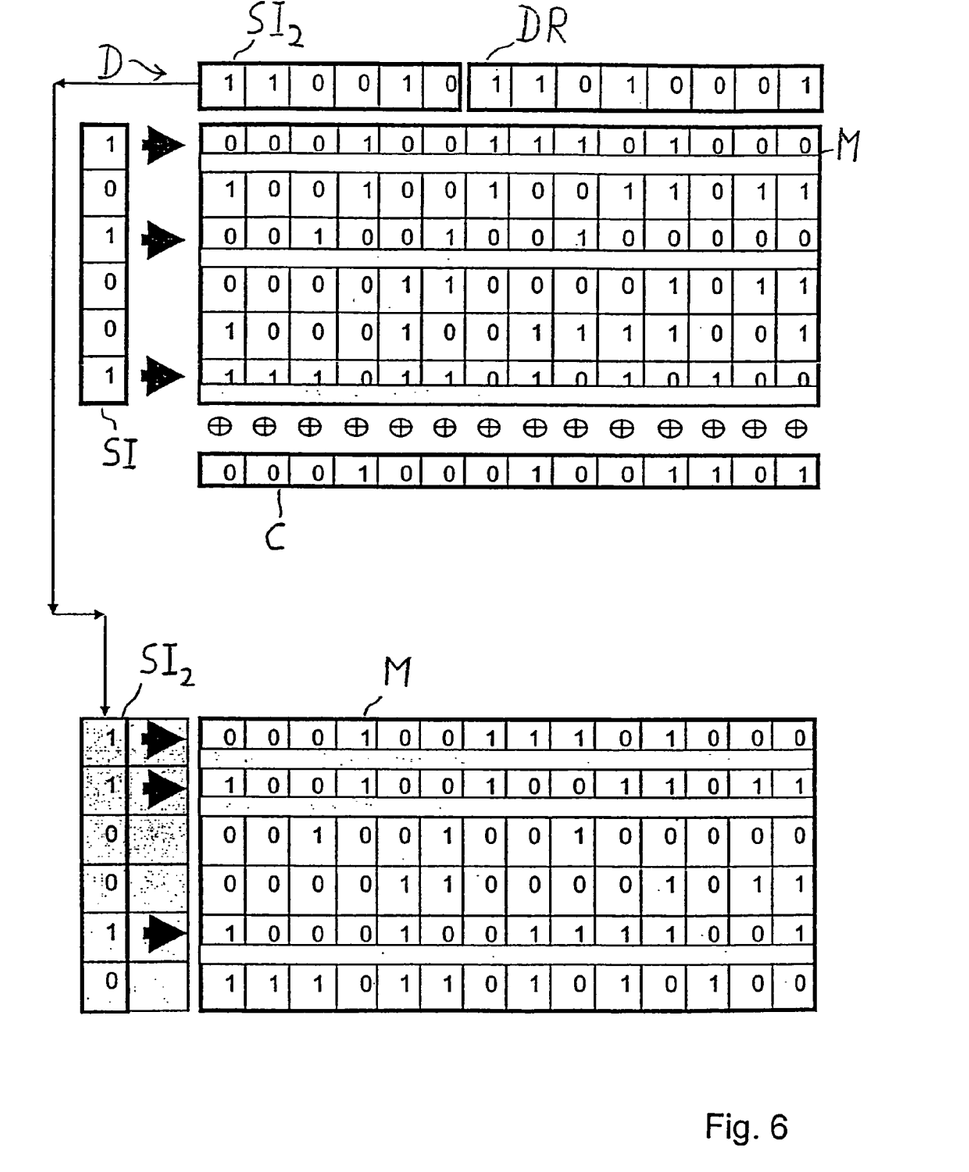
FIG. 6 shows the transmission of new key information according to an embodiment of the invention.

For simplification, FIG. 6 shows the generation of the encryption vector C directly from a linking of the data vector D and the relevant rows of the matrix M without illustrating the key vector S. According to FIG. 6 a second key information vector $SI_2$ can be sent as part of the data vector D in the plain text data transmitted. The second key information vector $SI_2$ can then be used to generate a new—second—key $S_2$ by means of the matrix M in the subsequent encryption method—according to the bottom half of FIG. 6—so that in the subsequent method in contrast to FIG. 7 a second encryption device 4 and second decryption device 6 are no longer required.

Figure 8:
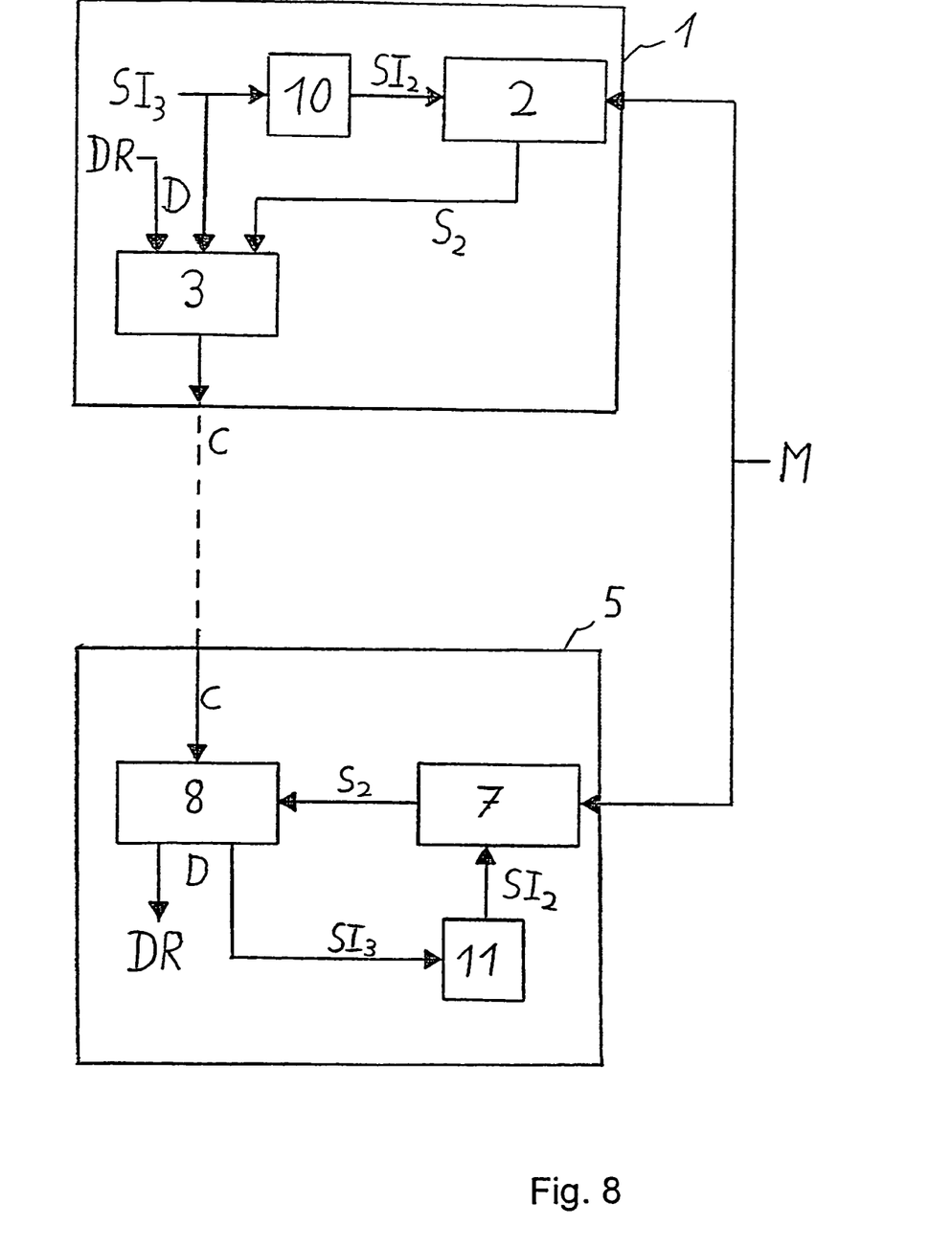
FIG. 8 shows a block diagram of a transmitting device and receiving device according to a further embodiment of the invention.

This is shown in more detail in FIG. 8. The second key information vector $SI_2$ transmitted with the first method of FIG. 7 is stored in a key information memory 10 and input into the key calculation device 2 for the next encryption process, which calculates a second key $S_2$ as described above and relays this to the encryption device 3. Furthermore, a third key information vector $SI_3$ is generated, e.g. by a random number generator, and this is, firstly, stored in the key information memory 10 for the next process and, secondly, input into the encryption device 3 together with residual data DR as a new data vector D, where a new encryption vector C is calculated and sent to the receiver 5.

The second key information vector $SI_2$ is read out in the receiver 5 from a key information memory 11, the second key $S_2$ is calculated in the key calculation device 7 from the matrix M and $SI_2$ and fed to the decryption device. The decryption device 8 calculates the data vector D from C and $S_2$, whereby its residual data DR can be read as plain text and the third key information vector $SI_3$ is input into the key information memory 11 for the next process. The key information memories 10 and 11 can in this case be designed, for example, as registers.

This method can be repeated for every data transmission so that the key vector is altered successively, which makes unauthorized decryption more difficult at least.

It will be seen that the invention includes at least the following 21 features:

1. A method for the encryption of data is provided in which a key vector (S) with a long second length (r) is generated from a secret key information vector (SI) with a short first length (p) and a public matrix (M), and an encryption vector (C) is formed from a data vector (D) with a third length (l), which is shorter than or equal to the second length (r), and the key vector (S) by means of a first encryption method.

2. Method according to Feature 1, in which the matrix (M), whose elements ($M_{ij}$) are randomly generated bits, has a height and width of the first and second length (r, p) comprising small matrix vectors (V1) with the short length (p) and large matrix vectors (V2) with the long length (r).

3. Method according to Feature 1 or 2, in which the small matrix vectors (V1), preferably also the large matrix vectors (V2), are not identical and not equal to zero.

4. Method according to one of the above Features, in which the key information vector (SI) specifies which of the large matrix vectors (V2) is to be used for determining the key vector (S).

5. Method according to Feature 4, in which the small matrix vectors (V1) are multiplied bit by bit with the key information vector (SI) and the digits of the key vector (S) are formed from the values created by these multiplications by way of an XOR link.

6. Method according to one of the above Features, in which the first encryption method is a symmetric encryption method, preferably a stream encryption method, in which the elements of the key vector (S) and the data vector (D) are interlinked.

7. Method according to Feature 6, in which in the first encryption method one element of the encryption vector (C) is determined from one element of the key vector (S) and one element of the data vector (D) by way of an XOR link.

8. Method according to one of the above Features, in which the key information vector (SI) is encrypted by means of a second encryption method, preferably an asymmetric encryption method, e.g. an RSA method.

9. Method for decryption of encrypted data, which have been formed by a method according to one of the above Features, in which a key vector (S) with a long second length (r) is formed from a key information vector (SI) with a short first length (p) and a public matrix (M), and a data vector (D) with the long second length (r) is formed from an encryption vector (C) with the long second length (r) and the key vector (S) by means of a first decryption method.

10. Method according to Feature 9, in which the first decryption method corresponds to the first encryption method and contains a link between the elements of the key vector (S) and the encryption vector (C) by way of an XOR link resulting to the elements of the data vector (D).

11. Method for the encrypted transmission of data from a transmitter (1) to a receiver (5) in which the transmitter (1) generates encryption vectors (C) from data vectors (D), a key information vector (SI) and a public matrix (M) by way of a method according to one of the Features 1-8, in which the encryption vectors (C) and the key information vector (SI) are sent to a receiver (5), and the receiver (5) decrypts the encryption vectors (C) from the public matrix (M) and the key information vector (SI) by means of a method according to Features 9 or 10.

12. Method according to Feature 11, in which the key information vector (SI) is encrypted by the transmitter by means of a public key (K1), e.g. an asymmetric encryption method, and the encrypted key information vector (CSI) is sent to the receiver (5), and the receiver (5) obtains the key information vector (SI) from the encrypted key information vector (CSI) by means of a private key (K2) from the encrypted key information signals (CSI).

13. Method according to Features 11 or 12, in which the data vectors (D) transmitted contain a second key information vector (SI$_2$) that is used to calculate a new key (S) by means of the public matrix (M) in a subsequent encryption method of the transmitter (1) and decryption method of the receiver (5).

14. Device for encryption of data by means of a method according to one of the Features 1-8 with a key calculation device (2) for calculating a key vector (S) with a long second length (r) from a key information vector (SI) with a short first length (p) and a matrix (M), and a first encryption device (3) for recording the key vector (S) and a data vector (D) with a third length (l), which is less than or equal to the long length (r), and supplying an encryption vector (C) with the long length (r).

15. Device according to Feature 14, in which it has a second encryption device (4) for encrypting the key information vector (SI), preferably by means of a public key (K1).

16. Device according to Feature 14 or 15 for executing a method according to Features 6 or 7, in which the first encryption device (3) contains a parallel computation device for the parallel calculation of the elements of the key vector (S).

17. Device for decryption of encrypted data by means of a method according to Features 9 or 10, with a key calculation device (7) for calculating the key vector (S) with a long second length (r) from a key information vector (SI) with a short first length (p) and a matrix (M), and a decryption device (8) for recording an encryption vector (C) with the long length (r) and the key vector (S) and for supplying a data vector (D) with the long second length (r).

18. Device according to Feature 17, in which it has a second decryption device (6) for recording a encrypted key information vector (CSI) and a private key (K2) and for supplying the key information vector (SI).

19. Encryption signal comprising one or more encryption vectors (V) produced by a method according to one of the Features 1-8.

20. Computer program comprising computer-executable instructions for executing a method according to one of the Features 1 to 8 or according to one of the Features 9 to 10 on a computer.

21. Computer program product or computer-readable medium comprising computer-compatible instructions for carrying out a method according to one of the Features 1 to 8 or according to one of the Features 9 to 10 on a computer.

While this invention has been described as having a preferred design, it is understood that it is capable of further modifications, uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed:

1. A method of encrypting a data vector, comprising:
generating a key vector from a secret key information vector and a publicly-available matrix, wherein the secret key information vector has a first length and the key vector has a second length, and wherein the first length is shorter than the second length; and
forming an encryption vector from the data vector and the key vector at an encryption device, wherein the encryption device is configured to implement a first encryption method, wherein the data vector has a third length, and wherein the third length is shorter than or equal to the second length.

2. The method of claim 1, wherein the public matrix comprises randomly generated bits, and wherein the publicly-available matrix has a first dimension and second dimension of the first and second length, respectively, comprising small matrix vectors with the first length and large matrix vectors with the second length.

3. The method of claim 2, wherein the small matrix vectors are not identical and not equal to zero.

4. The method of claim 3, wherein the key information vector comprises an indication of which of the large matrix vectors is to be used for determining the key vector.

5. The method of claim 4, further comprising multiplying the small matrix vectors bit by bit with the key information vector and the digits of the key vector are formed from the values created by these multiplications by way of an XOR link.

6. The method of claim 1, wherein the first encryption method is a symmetric encryption method in which the elements of the key vector and the data vector are interlinked.

7. The method of claim 6, wherein in the first encryption method one element of the encryption vector is determined from one element of the key vector and one element of the data vector by way of an XOR link.

8. The method of claim 1, wherein the key information vector is encrypted by means of a second encryption method.

9. A method of decrypting an encryption vector, comprising:
forming a key vector from a key information vector and a publicly-available matrix, wherein the key information vector has a first length and the key vector has a second length, and wherein the first length is shorter than the second length; and
forming a data vector from the encryption vector and the key vector at a decryption device, wherein the decryption device is configured to implement a first decryption method, wherein the data vector has a third length, and wherein the third length is shorter than or equal to the second length.

10. The method of claim 9, wherein the first decryption method comprises linking elements of the key vector and the encryption vector by way of an XOR link.

11. A device for encryption of data, comprising:
a key calculation device configured to calculate a key victor from a key information vector and a publicly-available matrix by means of a first encryption method, wherein the key information vector has a first length and the key vector has a second length, and wherein the first length is shorter than the second length; and
a first encryption device configured to form an encryption vector from the key vector and a data vector, wherein the data vector has a third length, and wherein the third length is less than or equal to the second length.

12. The device of claim 11, further comprising:
a second encryption device configured to encrypt the key information vector.

13. The device of claim 11, wherein the first encryption device includes a parallel computation device for the parallel calculation of the elements of the key vector; and wherein the first encryption method is a symmetric encryption method in which the elements of the key vector and the data vector are interlinked.

14. A device for decryption of encrypted data, comprising:
a key calculation device configured to form a key vector from a key information vector and a publicly-available matrix, wherein the key information vector has a first length and the key vector has a second length, and wherein the first length is shorter than the second length;
a decryption device configured to form a data vector from an encryption vector and the key vector by means of a first decryption method, wherein the data vector has a third length, and wherein the third length is shorter than or equal to the second length.

15. The device of claim 14, further comprising:
a second decryption device configured to form the key information vector from an encrypted key information vector and a private key.

16. An article of manufacture including a computer-readable medium having instructions stored thereon that, when executed by a computing device, causes the computing device to perform operations comprising:
generating a key vector from a secret key information vector and a publicly-available matrix, wherein the secret key information vector has a first length and the key vector has a second length, and wherein the first length is shorter than the second length; and
forming an encryption vector from a data vector and the key vector by means of a first encryption method, wherein the data vector has a third length, and wherein the third length is shorter than or equal to the second length.

17. The method of claim 3, wherein the large matrix vectors are identical and not equal to zero.

18. The method of claim 1, wherein the first encryption method comprises a stream encryption method.

19. The method of claim 1, wherein the key information vector is encrypted by use of an asymmetric encryption method.

20. The method of claim 19, wherein the key information vector is encrypted by use of an RSA method.

21. The method of claim 9, wherein the first decryption method corresponds to a first encryption method and contains a link between the elements of the key vector and the encryption vector by way of an XOR link including the elements of the data vector.

22. The method of claim 21, wherein the key information vector is encrypted by a transmitter by use of an asymmetric encryption method.

23. The method of claim 12, wherein the second encryption device encrypts the key information vector by use of a public key.

24. The method of claim 14, wherein the first decryption method corresponds to a first encryption method and contains a link between the elements of the key vector and the encryption vector by way of an XOR link including the elements of the data vector.

25. An article of manufacture including a computer-readable medium having instructions stored thereon that, when executed by a computing device, causes the computing device to perform operations comprising:
forming a key vector from a key information vector and a publicly-available matrix, wherein the key information vector has a first length and the key vector has a second length, and wherein the first length is shorter than the second length; and forming a data vector from an encryption vector and the key vector by means of a first decryption method, wherein the data vector has a third length, and wherein the third length is shorter than or equal to the second length.

* * * * *

UNITED STATES PATENT AND TRADEMARK OFFICE
CERTIFICATE OF CORRECTION

| | | |
|---|---|---|
| PATENT NO. | : 7,949,128 B2 | Page 1 of 1 |
| APPLICATION NO. | : 11/605486 | |
| DATED | : May 24, 2011 | |
| INVENTOR(S) | : Bunimov et al. | |

It is certified that error appears in the above-identified patent and that said Letters Patent is hereby corrected as shown below:

Title page, below item (63), under "Related U.S. Application Data" in Column 1, Line 1, below "Related U.S. Application Data (63) Continuation of application No. 10/259,806, filed on Sep. 30, 2002, now abandoned."
insert -- (30) Foreign Application Priority Data Sep. 29, 2001 (DE).................. 101 48 415.1 --.

Title page, item (56), under "Other Publications", in Column 2, Line 8, delete "Scarch" and insert -- Search --.

Column 9, line 20, in Claim 11, delete "victor" and insert -- vector --.

Column 10, line 32, in Claim 23, delete "method" and insert -- device --.

Signed and Sealed this
Fourth Day of October, 2011

David J. Kappos
*Director of the United States Patent and Trademark Office*